US008140593B2

(12) United States Patent
Murray et al.

(10) Patent No.: US 8,140,593 B2
(45) Date of Patent: *Mar. 20, 2012

(54) DATA VIEWER MANAGEMENT

(75) Inventors: Michael Charles Murray, Seattle, WA (US); James R. Flynn, Seattle, WA (US); Antony Scott Williams, Mercer Island, WA (US); Laurent Mollicone, Kirkland, WA (US); Siddharth Jayadevan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 403 days.

This patent is subject to a terminal disclaimer.

(21) Appl. No.: 12/121,485

(22) Filed: May 15, 2008

(65) Prior Publication Data
US 2009/0287724 A1 Nov. 19, 2009

(51) Int. Cl.
*G06F 17/30* (2006.01)

(52) U.S. Cl. .................... 707/805; 707/999.102

(58) Field of Classification Search .......... 707/793, 707/805, 999.003, 999.101, 999.102, 619; 715/764, 802
See application file for complete search history.

(56) References Cited

U.S. PATENT DOCUMENTS

| | | |
|---|---|---|
| 4,447,888 A | 5/1984 | Kuecker |
| 4,862,410 A | 8/1989 | Fukunaga |
| 5,050,105 A | 9/1991 | Peters |
| 5,212,771 A | 5/1993 | Gane et al. |
| 5,307,493 A | 4/1994 | Gusenius |
| 5,513,305 A | 4/1996 | Maghbouleh |
| 5,596,704 A | 1/1997 | Geddes et al. |
| 5,694,608 A | 12/1997 | Shostak |
| 5,754,859 A | 5/1998 | Long |
| 5,825,355 A | 10/1998 | Palmer |
| 5,940,615 A | 8/1999 | Novick |
| 6,018,738 A | 1/2000 | Breese |
| 6,049,335 A | 4/2000 | Lida |
| 6,055,327 A | 4/2000 | Aragon |
| 6,098,072 A | 8/2000 | Sluiman |
| 6,110,223 A | 8/2000 | Southgate |
| 6,167,455 A | 12/2000 | Friedman |

(Continued)

FOREIGN PATENT DOCUMENTS

WO WO2006096792 9/2006

OTHER PUBLICATIONS

Getting to know Simile the visual modelling environment for ecological, biological and environmental research http://www.simulistics.com/documents/Simile.pdf (42 pages).

(Continued)

*Primary Examiner* — Marc Filipczyk
(74) *Attorney, Agent, or Firm* — Workman Nydegger

(57) ABSTRACT

Embodiments described herein are directed to generating a customized data viewer, where the viewer is configured to display data at any level in a data model. In one embodiment, a computer system receives a user request indicating that portions of data are to be displayed in a user-customized manner using a data viewer. The computer system accesses the requested data portions that are to be displayed with the data viewer. The computer system generates a dynamic data viewer configured to display the accessed data portions in the user-customized manner indicated in the received user request. The computer system also applies the generated dynamic data viewer to the accessed data portions, such that the generated viewer displays the requested data portions in the user-customized manner.

16 Claims, 4 Drawing Sheets

U.S. PATENT DOCUMENTS

| | | |
|---|---|---|
| 6,232,984 B1 | 5/2001 | Chuah |
| 6,243,091 B1 | 6/2001 | Berstis |
| 6,269,475 B1 | 7/2001 | Farrell et al. |
| 6,335,745 B1 | 1/2002 | Amro |
| 6,405,216 B1 | 6/2002 | Minnaert |
| 6,558,431 B1 | 5/2003 | Lynch |
| 6,717,589 B1 | 4/2004 | Grillo |
| 6,806,887 B2 | 10/2004 | Chernock |
| 6,851,107 B1 | 2/2005 | Coad |
| 6,985,876 B1 | 1/2006 | Lee |
| 6,986,103 B1 | 1/2006 | Beezer |
| 6,995,768 B2 | 2/2006 | Jou |
| 7,007,029 B1 | 2/2006 | Chen |
| 7,110,936 B2 | 9/2006 | Hiew |
| 7,196,712 B2 | 3/2007 | Rajarajan |
| 7,240,296 B1 * | 7/2007 | Matthews et al. ............. 715/840 |
| 7,272,815 B1 | 9/2007 | Eldridge et al. |
| 7,370,315 B1 | 5/2008 | Lovell et al. |
| 7,596,611 B1 * | 9/2009 | Satish et al. ................... 709/223 |
| 7,712,042 B2 * | 5/2010 | Hernandez-Sherrington et al. ............................ 715/781 |
| 7,743,330 B1 * | 6/2010 | Hendricks et al. ............ 715/723 |
| 2001/0028368 A1 | 10/2001 | Swartz |
| 2002/0099584 A1 | 7/2002 | Findley et al. |
| 2002/0109717 A1 | 8/2002 | Li |
| 2002/0158864 A1 | 10/2002 | Matichuk |
| 2003/0043200 A1 | 3/2003 | Faieta |
| 2004/0027388 A1 | 2/2004 | Berg et al. |
| 2004/0036718 A1 | 2/2004 | Warren |
| 2004/0122791 A1 | 6/2004 | Sea |
| 2005/0114778 A1 | 5/2005 | Branson |
| 2005/0187930 A1 | 8/2005 | Subramanian |
| 2005/0210412 A1 | 9/2005 | Matthews |
| 2005/0210445 A1 | 9/2005 | Gough et al. |
| 2006/0015817 A1 | 1/2006 | Fioretti |
| 2006/0112123 A1 | 5/2006 | Clark |
| 2006/0168182 A1 | 7/2006 | Fuller et al. |
| 2006/0200476 A1 | 9/2006 | Gottumukkala et al. |
| 2006/0224997 A1 | 10/2006 | Wong |
| 2006/0294474 A1 | 12/2006 | Taylor |
| 2007/0061758 A1 | 3/2007 | Manson et al. |
| 2007/0106974 A1 | 5/2007 | Chafe |
| 2007/0130193 A1 | 6/2007 | McNally et al. |
| 2007/0136333 A1 | 6/2007 | Hassan ABD Elrahman |
| 2007/0214173 A1 | 9/2007 | Ohashi et al. |
| 2007/0299823 A1 | 12/2007 | Getsch |
| 2008/0196015 A1 | 8/2008 | Bekelman |
| 2009/0284549 A1 | 11/2009 | Flynn |

OTHER PUBLICATIONS

Process Component Models: The Next Generation in Workflow ? (17 pages) http://www.infoq.com/articles/process-component-models.
Margaret-Anne Storey, Casey Best, Jeff Michaud, Derek Rayside, Marin Litoiu, Mark Musen "SHriMP Views: An Interactive Environment for Information Visualization and Navigation" http://sigchi.org/chi2003/docs/shrimp.pdf 2003.
Flavius Frasincar, Alexandru Telea and Geert-Jan Houben "Adapting Graph Visualization Techniques for the Visualization of RDF Data" http://wwwis.win.tue.nl/~houben/respub/vsw2005.pdf 2005.
T. Dean Hendrix et al. "Language Independent Generation of Graphical Representations of Source Code", Proceedings of the 1995 ACM 23rd Annual Conference on Computer Science, 1995, pp. 66-72.
Martin Klang "XML and the Art of Code Maintenance", Extreme Markup Languages 2003: Proceedings, 2003.
Dong Hyuk Park et al. "XML rule based source code generator for UML Case tool", Software Engineering Conference, 2001. APSEC 2001. Eighth Asia-Pacific, 2001, pp. 53-60.
Stallman, Richard, "EMACS The Extensible, Cumstomizable Self-Documenting Dislay Editor"; ACM, 1981, 10 pg.
Maruyama et al., "A Case Tool Platform Using an XML Representation of Java source Code"; Source Code Analysis and Manipulation, Fourth IEEE International Workshop on (SCAM'04); Sep. 16, 2004; 10 pg.
U.S. Appl. No. 11/674,109 Jun. 25, 2010 Office Action.
U.S. Appl. No. 11/674,109, Oct. 5, 2010, Notice of Allowance.
R. Ian Bull and Jean-Marie Favre "Visualization in the Context of Model Driven Engineering" http://webhome.cs.uvic.ca/~chisel/pubs/irbull_mddaui.pdf, 2005, 4 pages.
Jonathat I. Maletic et al. "Source Code Files as Structured Documents", Proceedings of the 10th International Workshop on Program Comprehensions 2002, 4 pages (IWPC'02).
Oculus Info, Inc., "Using Oculus.Net for Your Business Data Visualization Solutions: A Technical Overview", 2007, pp. 1-17.
U.S. Appl. No. 12/121,755, Jun. 14, 2011, Office Action.

* cited by examiner

DATA VIEWER MANAGEMENT

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or data on other computer systems. For example, some software applications may be designed to display data in the form of a model, or in some other form. Models may be used to illustrate objects along with various relationships between the objects. For example, a process flow diagram may illustrate the various steps involved in a particular process, and how each step relates to other steps (e.g. processing order, etc.).

Often, it is desirable to view data from different perspectives. For example, different users often have different needs with regard to the data. An end-user, for instance, may look at certain pieces of information from a high level, whereas a system architect may choose a more detailed perspective. In many cases, data viewing perspectives are specified in the application viewer. When a particular perspective is chosen to display a portion of content, that perspective is typically applied to the entire data portion in a rigid, uniform fashion.

BRIEF SUMMARY

Embodiments described herein are directed to generating a customized data viewer, where the viewer is configured to display data at any level in a data model. In one embodiment, a computer system receives a user request indicating that portions of data are to be displayed in a user-customized manner using a data viewer. The computer system accesses the requested data portions that are to be displayed with the data viewer. The computer system generates a dynamic data viewer configured to display the accessed data portions in the user-customized manner indicated in the received user request. The computer system also applies the generated dynamic data viewer to the accessed data portions, such that the generated viewer displays the requested data portions in the user-customized manner.

In another embodiment, a computer system accesses data that is to be displayed using an initial data viewer, the initial data viewer displaying data of various types according to one or more stored data type mappings. The computer system receives user input indicating that stored data type mappings are to be changed and dynamically modifies the initial data viewer based on the received user input. The computer system assigns a name to the modified initial data viewer and stores the named data viewer in a viewer repository, such that other users can access and use the named data viewer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
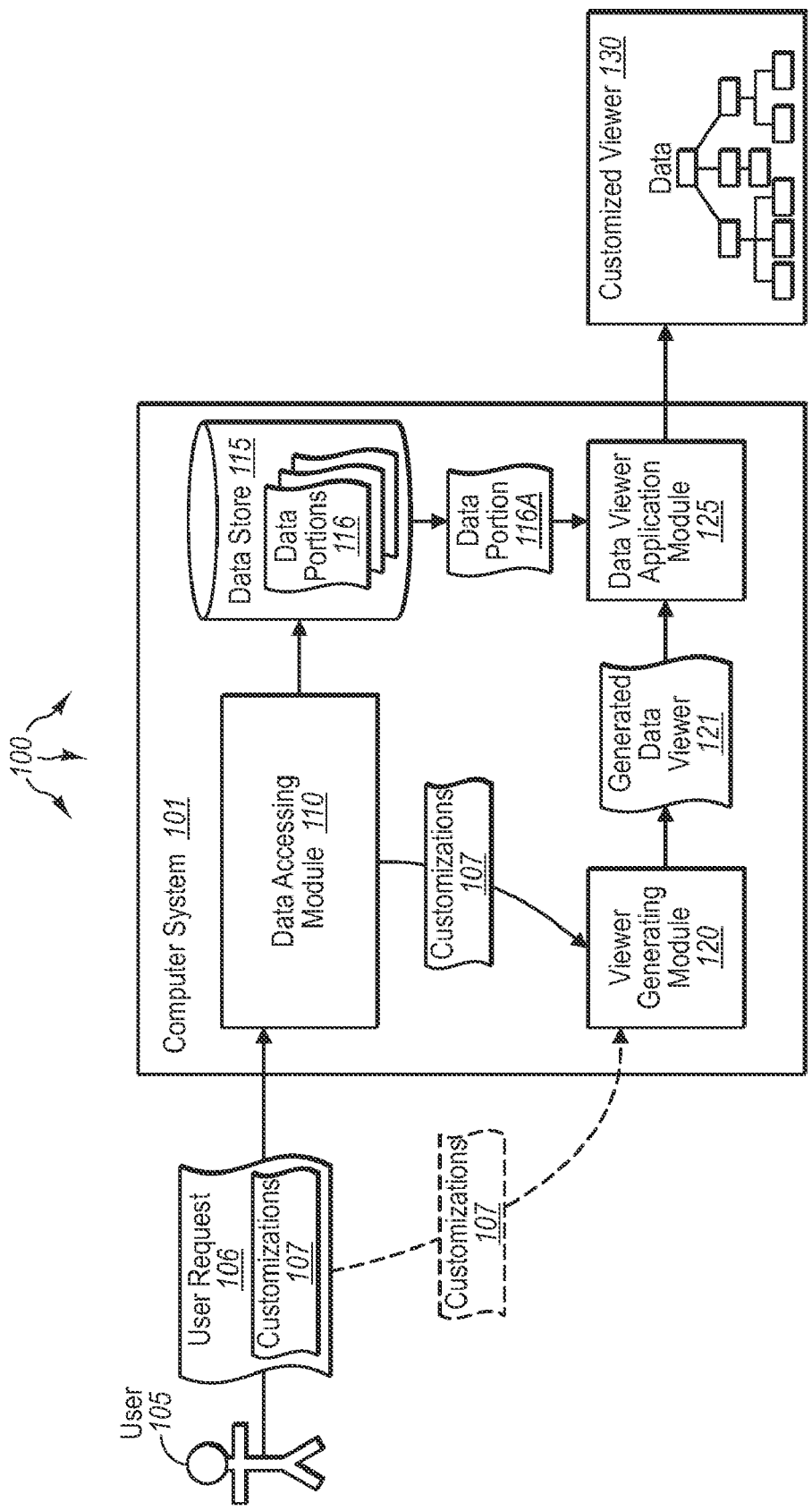
FIG. 1 illustrates a computer architecture in which embodiments of the present invention may operate including generating a customized data viewer, where the viewer is configured to display data at any level in a data model.

Embodiments described herein are directed to generating a customized data viewer, where the viewer is configured to display data at any level in a data model. In one embodiment, a computer system receives a user request indicating that portions of data are to be displayed in a user-customized manner using a data viewer. The computer system accesses the requested data portions that are to be displayed with the data viewer. The computer system generates a dynamic data viewer configured to display the accessed data portions in the user-customized manner indicated in the received user request. The computer system also applies the generated dynamic data viewer to the accessed data portions, such that the generated viewer displays the requested data portions in the user-customized manner.

In another embodiment, a computer system accesses data that is to be displayed using an initial data viewer, the initial data viewer displaying data of various types according to one or more stored data type mappings. The computer system receives user input indicating that stored data type mappings are to be changed and dynamically modifies the initial data viewer based on the received user input including the mappings changes while the data is being presented. The computer system assigns a name to the modified initial data viewer and stores the named data viewer in a viewer repository, such that other users can access and use the named data viewer.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. In some embodiments, computer system 101 may include a variety of modules, data stores, and other components. Each is capable of intercommunication with the other components, and may be configured to communicate with modules and components of other computer systems connected via a computer network. Computer system 101 includes data accessing module 110. In some embodiments, data accessing module 110 may be configured to receive user request 106 and customizations 107 from user 105. User 105 may be any type of computer user including an end-user, a software engineer, a system administrator, or other user.

User request 106 may include an indication that various data portions displayable in a software application are to be displayed in a customized manner. For example, a software application running on computer system 101 may output data that is displayed for user 105 on some type of display. The software application may be configured to access and edit certain types of information accessed in data store 115. The data (e.g. data portions 116) may include any type of information including files or file portions, raw data, searchable database information or any other type of data. User 105 may desire to view all or a portion of the data in a customized manner. User 105 may indicate in customizations 107 how the data is to be displayed.

For example, a software application may display data portions 116A as a flow chart with corresponding objects and connectors. User 105 may desire to view some of data portions 116A in a list view, or as an embedded spreadsheet. Additionally or alternatively, different background images, shapes or colors may be applied. Along those lines, similar or different changes may be made to any text included in data portions 116A. In some embodiments, customizations 107 may be received at data accessing module 110 and passed to viewer generating module 120. In other embodiments, customizations 107 may be sent directly to viewer generating module 120. After receiving user request 106 with customizations 107, data accessing module 110 may access data portion 116A based on user request 106. Data portion 116A may be sent to data viewer application module 125 for application to a generated viewer.

In some embodiments, viewer generation module 120 may be configured to dynamically generate a data viewer based on customizations 107. In some cases, module 120 may alter or modify an existing viewer. For instance, a viewer that is currently being used to display software application data may be dynamically modified by module 120 according to customizations 107. Additionally or alternatively, module 120 may generate a data viewer (e.g. data viewer 121) and pass the viewer to data viewer application module 125. Module 125 may be configured to apply data viewer 121 to data portion 116. Thus, in some embodiment, viewer 121 generated based on customizations 107 may be used to view data portion 116 selected by user request 106. The resulting customized viewer 130 may thus display data portion 116A along with other data portions for viewing by user 105. In some embodiments, customized viewer 130 may be stored in a central database and made available to other users for application to other data portions. These and other concepts will be explained in greater detail with regard to method 300 of FIG. 3 below.

Figure 3:
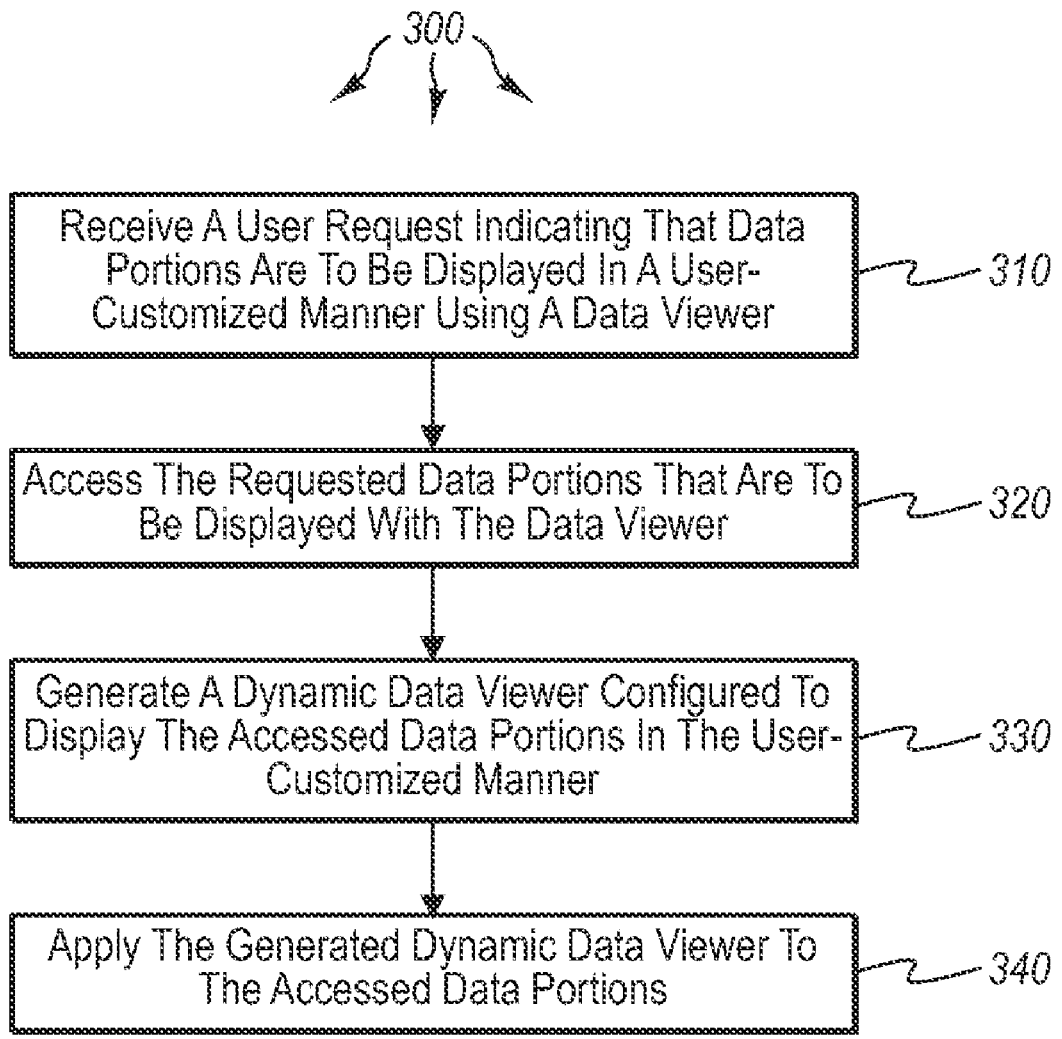
FIG. 3 illustrates a flowchart of an example method for generating a customized data viewer, where the viewer is configured to display data at any level in a data model.

FIG. 3 illustrates a flowchart of a method 300 for generating a customized data viewer, where the viewer is configured to display data at any level in a data model. The method 300 will now be described with frequent reference to the components and data of environment 100.

Method 300 includes an act of receiving a user request indicating that one or more portions of data are to be displayed in a user-customized manner using a data viewer (act 310). For example, data accessing module 110 may receive user request 106 indicating that data portion 116A is to be displayed in a user-customized manner using generated data viewer 121. In some cases, data portion 116A may include data corresponding to a data model. For example, the data may be part of an organizational flowchart, or part of a system work flow model, or other portion of organized information. User 105 may desire to specify how certain portions of information are displayed. For instance, a user may specify that all text referring to a certain object is italicized. Or, a user may specify that all objects with a certain hierarchical relationship to a designated object are displayed in list form, or in embedded spreadsheet form, or in a certain color, font, size, shape, presented with a certain animation or transition, color scheme, background, or other customization. Many other customizations may be implemented in the system herein.

Method 300 includes an act of accessing the requested data portions that are to be displayed with the data viewer (act 320). For example, data accessing module 110 may access data portions 116/116A that are to be displayed with customized viewer 130. As mentioned above, the data in data store 115 may be any type of data, stored in any format or file configuration. Data accessing module 110 may access data in data store 115 or in any other data store in computer system 101 or in another computer system or storage network. Data portion 116A may include one or more portions of a file, one or more entire files or groups of files, or simply raw data which can be queried using database query commands.

Method 300 includes an act of generating a dynamic data viewer configured to display the accessed data portions in the user-customized manner indicated in the received user request (act 330). For example, viewer generating module 120 may generate dynamic data viewer 121 configured to display data portion 116A in the user-customized manner indicated in user request 106. In some embodiments, user request 106 may indicate which data is to be displayed and customizations 107 may indicate how the data is to be displayed in the viewer. Viewer generating module 120 may dynamically generate viewer 121 for data 116 while an application configured to edit or use data 116 is in operation. Thus, if an application is accessing and displaying data 116 on a default display, viewer generating module 120 may be configured to generate a new viewer while the application is running based on user request 106 and/or customizations 107.

In cases where a default or current viewer is being used, viewer generating module 120 may be configured to modify the default viewer according to the customizations indicated by user 105. In such cases, module 120 may initially copy the default viewer to data store 115 or to some other store for maintaining data viewers. Thus, the default viewer and other viewers may be archived and made available to other users. Similarly, any customized viewers generated by viewer generating module 120 (e.g. customized viewer 130) may be stored in a viewer store and made available to other computer system or computer network users. The network may include a local area network, an intranet, the internet, or any other type of network. In cases where viewer generating module 120 modifies a current or default data viewer, some of the data requested in user request 106 may be displayed using the default viewer and the remainder may be displayed using the modified viewer.

Method 300 includes an act of applying the generated dynamic data viewer to the accessed data portions, such that the generated viewer displays the requested data portions in the user-customized manner (act 340). For example, data viewer application module 125 may apply generated data viewer 121 to data portion 116A, where the generated viewer displays the data portions requested in request 106 in the user-customized manner. Thus, different viewers may be generated and applied to different data portions, as requested by the user.

In some embodiments, where data portion 116 corresponds to model data, the model data may be displayed according to a current display view using a current data viewer. User input (e.g. user request 106) may be received indicating the view is to be switched to a different display view. The user input includes one or more data viewer edits that are to be applied to the current data viewer resulting in a customized data viewer. Computer system 101 may switch display views from the current display view to the modified display view by dynamically editing the current data viewer according to the received data viewer edits. The applied edits, in this case, may cause the display view to be switched from the current view to the modified view displayed with the edited, customized data viewer. In some scenarios, each of the different views represents a different perspective of the model data.

Additionally or alternatively, user 105 may use the generated dynamic data viewer to modify one or more other data viewers. Using a generated viewer, a viewer's data may be modified, resulting in another, different customized viewer. Thus, viewers may be combined, edited or otherwise modified to suit a particular user's needs. The user may customize multiple data viewers, and use each in different scenarios. Rules may also be established that dictate when a certain viewer is to be used. For example, user 105 may dictate that when certain data is being displayed, Customized Viewer A is to be used, and when other data is being displayed, Customized Viewer B is to be used. The transition between viewers may occur instantaneously, once the new or other data is requested for display. Viewers may be generated or selected based on a user's artistic tastes, functionality needs or any other criteria. Any data subsequently accessed may be displayed according to a user's customized viewer, a default viewer, or by another user's customized viewer.

In one embodiment, data accessing module 110 may receive a user request indicating that among a plurality of data portions (e.g. 116) corresponding to a data model, each data type in the model is to be displayed in a user-customized manner according to the data type using a data viewer. Data accessing module 110 may access the requested data portions of the model that are to be displayed with the data viewer (e.g. viewer 121). Viewer generating module 120 may generate a dynamic data viewer (e.g. 121) configured to display each accessed data portion of the model according to the user-customized manner for the data type as indicated in the received user request. Thus, viewers may be generated in a different manner, depending on the data type indicated in the request. Moreover, data viewer application module 125 may apply the generated dynamic data viewer to the accessed data portions of each data type, where the generated viewer (e.g. customized viewer 130) displays each requested data portion in the user-customized manner according to the data type. Data viewer generation and modification will be explained in greater detail below with regard to computer architecture 200 of FIG. 2 and method 400 of FIG. 4.

Figure 2:
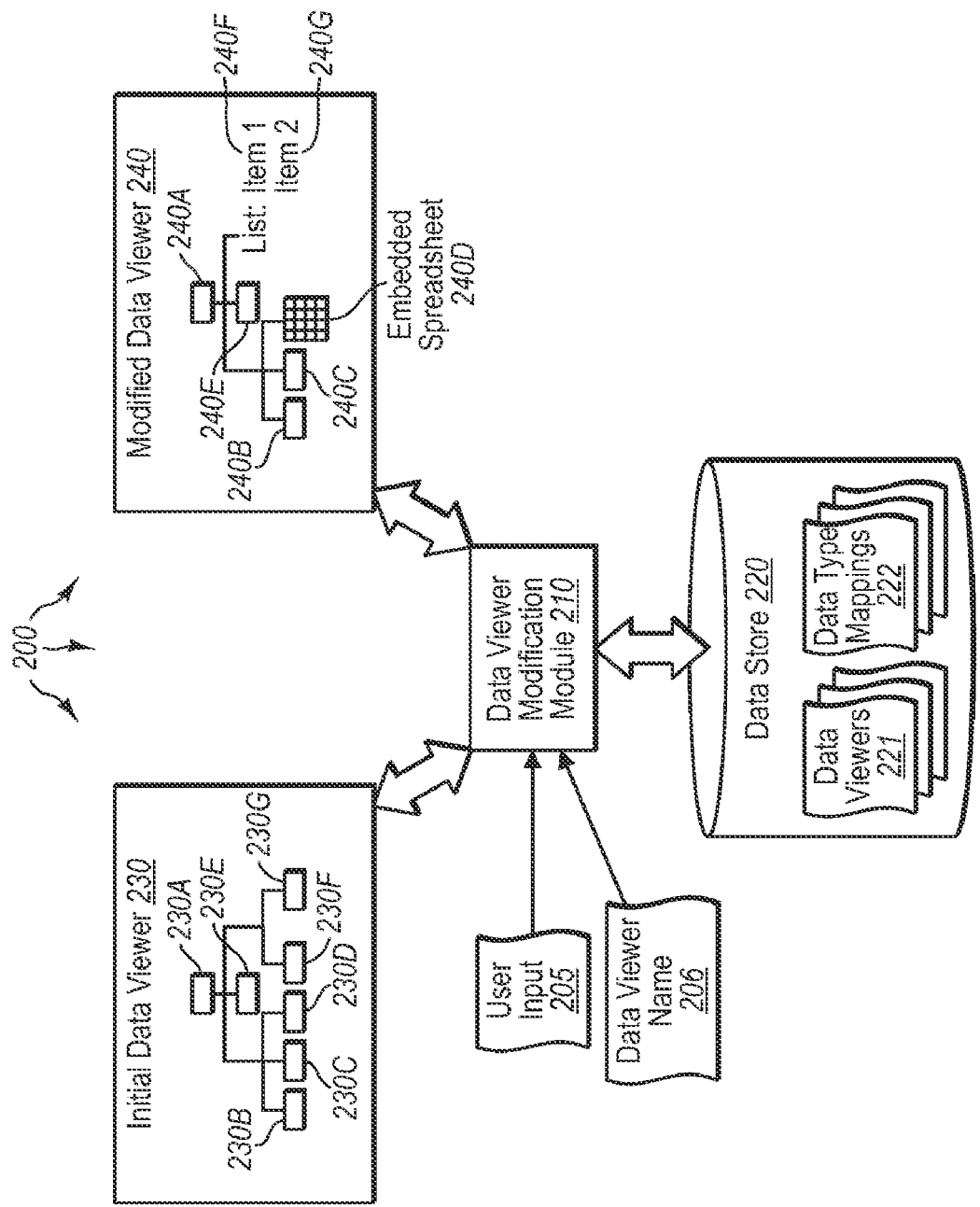
FIG. 2 illustrates a computer architecture in which embodiments of the present invention may operate including dynamically applying a modified data viewer at any level in a data model.
Figure 4:
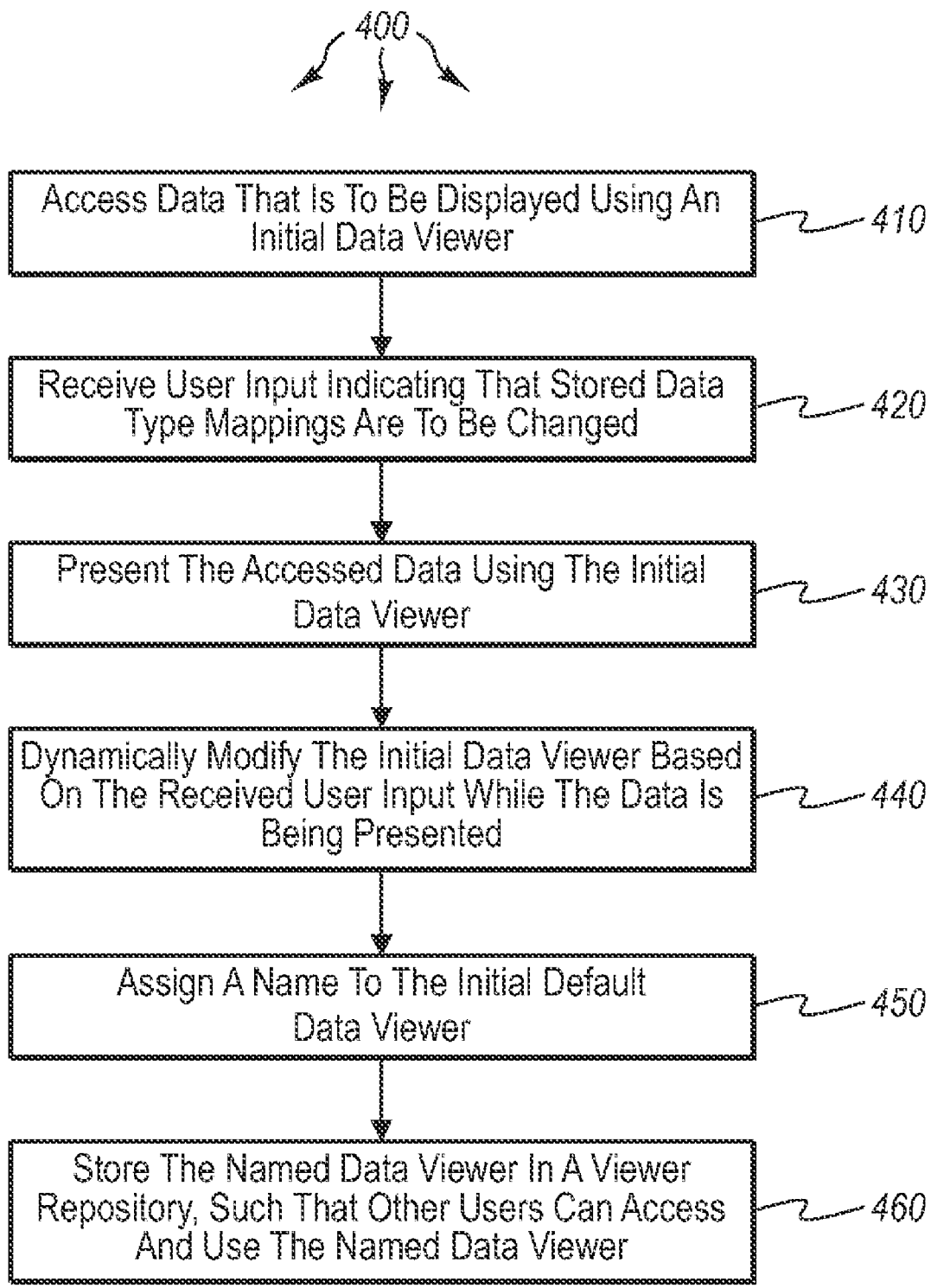
FIG. 4 illustrates a flowchart of an example method for dynamically applying a modified data viewer at any level in a data model.

FIG. 2 illustrates a computer architecture 200 in which the principles of the present invention may be employed. FIG. 4 illustrates a flowchart of a method 400 for dynamically applying a modified data viewer at any level in a data model. The method 400 will now be described with frequent reference to the components and data of environments 100 of FIGS. 1 and 200 of FIG. 2.

Method 400 includes an act of accessing data that is to be displayed using an initial data viewer, the initial data viewer displaying data of various types according to one or more stored data type mappings (act 410). For example, data accessing module 110 may access data portion 116A that is to be displayed using initial data viewer 230, where viewer 230 displays data of various types according to stored data type mappings. Accordingly, when certain data types are to be viewed in a predetermined manner, the data types would have mappings to certain viewers or views within a viewer. Thus, where a user (e.g. user 105) has selected a particular viewer for a model type, the appropriate viewer may be selected from stored data viewers 221 based on the established mapping.

In some embodiments, an appropriate viewer may be selected for a portion of model data based on the context of the data portion. For example, if data portion 116A is part of a list of data items, an appropriate viewer for that data may include a viewer that displays the data in a list form. Additionally or alternatively, if the data portion is part of a table or spreadsheet (or is embedded or nested in such), or is part of a collection or is a single item, an appropriate viewer for that data may be selected that is configured to display the data in an appropriate form, based on the data's context. As indicated above, user 105 may customize and specify, for each context, how the data is to be displayed. Different views may include table, list, flow diagram, master-detail (e.g. where the master is displayed as a tree and the details are displayed as a list), embedded, and other views.

Method 400 includes an act of presenting the accessed data using the initial data viewer (act 420). For example, initial data viewer 230 may present any or all of data portions 230A, 230B, 230C, 230D, 230E, 230F and 230G. Data objects 230A-G may be displayed as an object-link diagram as shown, or in some other form. The initial data viewer 230 may be a default viewer for a certain software application, or be the default viewer for a certain type of information. For example, default viewer 230 may be used whenever a database accessing software application is used, or whenever organizational workflows are to be displayed. Such associations between data viewers and data or data types may be referred to as data type mappings (e.g. 222).

Method 400 includes an act of receiving user input indicating that one or more stored data type mappings are to be changed (act 430). For example, data viewer modification module 210 may receive user input 205 indicating that stored data type mappings 222 are to be changed. In some cases, modifications made to mappings 222 may be user specific. That is, each user may make changes to mappings 222 that only affect that user's mappings. Additionally or alternatively, settings may be configured to allow one user's changes to affect other user's mappings. Also, some mappings may be system-wide and may be permanent or only changeable by a system administrator.

Method 400 includes an act of dynamically modifying the initial data viewer based on the received user input including the mappings changes while the data is being presented (act 440). For example, data viewer modification module 210 may dynamically modify initial data viewer 230 based on received user input 205 including changes made to mappings 222 while the data is being presented in the initial viewer. This modification may result in modified data viewer 240. Such dynamic modification allows data to be displayed in initial viewer 230 and be modified at the same time. Thus, an initial data viewer may be used to modify the data of the initial data viewer. The initial data viewer (and other modified viewer) is comprised of editable data that can be edited on-the-fly while the viewer is being used to display other data portions.

Thus, in FIG. 2, Modified data viewer 240 may include objects that have remained unchanged in the modification including 240A, 240B, 240C and 240E. Other data objects, however, have been modified such that they are displayed in a different, modified manner. For example, object 230D is now displayed as embedded spreadsheet 240D. Likewise, objects 240F and 240G are now displayed in modified data viewer 240 as list objects in a list. These modifications may be made as the result of a determination that the context of those data objects dictated a change. For instance, as explained above, if it is determined that the context for data object 230D is embedded, and the data is appropriately displayed as a spreadsheet, modification module 210 may make the appropriate modification according to mappings 222, resulting in embedded spreadsheet 240D. Similarly, if it is determined that the context for data objects 230F and 230G is combination (as opposed to single), and the data is appropriately displayed as items in a list, modification module 210 may make the appropriate modification according to mappings 222, resulting in List Item 1 (240F) and List Item 2 (240G).

Many other contexts and display forms are possible, each of which (including corresponding data type mappings) is fully customizable by the user. For instance, a user may desire to view a model from different perspectives such as a module perspective, parameter perspective, high-level, low-level and in-between. Moreover, a user may desire to have displayed a unified view with multiple perspectives displayed in single viewer. Thus, for example, business processes and architectural pieces may be displayed using the same viewer. Other users may wish to view the same data according to different perspectives to suit their needs. The user may thus modify or customize the viewer to display each type of information at any level in the model according to a user-defined manner.

Method 400 includes an act of assigning a name to the modified initial data viewer (act 450). For example, data viewer modification may receive data viewer name 206 and assign the received name to modified data viewer 240. In some cases, viewers may be combined, and one portion of a viewer may be used to display one portion of data, and another viewer may be used to display another portion of data. In some cases, user 105 may request that a stored viewer (e.g. data viewer 221 stored in data store 220) be used to display at least a portion of data requested in user request 106. In some cases, a previously stored viewer may be requested and used to view the entire portion of requested data.

Method 400 includes an act of storing the named data viewer in a viewer repository, such that other users can access and use the named data viewer (act 460). For example, modified data viewer 240 may be stored in data store 220. Data store 220 may be accessible to other computer (network) users which may request certain viewers for displaying different portions of data. In some cases, storing the named viewer in a viewer repository (e.g. data store 220) comprises storing only the changes made to initial viewer 230. Such an embodiment may reduce storage burdens, as only the modifications to the initial viewer are stored.

In some embodiments, the named modified data viewer 240 may be dynamically applied to the accessed data, such that the data is displayed according to the mappings associated with the modified viewer. In some cases, a user may access data store 220 and browse available viewers. The viewers (e.g. 221) may include default or professionally designed viewers and may include user created views, which may include modified versions of the professionally designed viewers. These viewers, as explained above, may be configured to display data in a user-specified manner at any level of a data model, and may be used to edit the data models themselves. Data viewers may be selected for and used with a specific data type. In some embodiments, a user may be able to specify (e.g. in a drop down list) a data type and search for those data viewers that correspond to the data type. Other types of searching based on data context or data type may also be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system in computer networking environment, the computer system comprising a memory operatively coupled to a processor, a method for dynamically applying a new data viewer at any level in a data model, the method comprising:
    an act of a computer system, having a memory operatively coupled to a processor, accessing a data model that is to be displayed using an initial data viewer,
        wherein the accessed data model comprises a first data portion having a first data type and a second data portion having a second different data type, and
        wherein the initial data viewer is configured to simultaneously display each data portion according to (i) stored data type mappings that map each data portion to a corresponding display format based on data type, and (ii) a context of each data portion relative to one another within the data model, such that the initial data viewer is configured to display the first data portion in a first display format and the second data portion in a second display format that are selected based on a combination of the stored data type mappings and context;
    an act of the computer system selecting the first display format and the second display format, including selecting at least the second display format based on a context of the second data portion relative to the first data portion within the data model overriding the corresponding display format for the second data portion as defined in the stored data type mappings;
    an act of presenting the accessed data model using the initial data viewer by simultaneously presenting the first data portion in the first display format while also presenting the second data portion in the second display format;
    an act of receiving user input from a first user simultaneous to the accessed data model being presented, the user input expressly mapping the first data type with a new display format that is different from the first display format;
    subsequent and in response to receiving the user input, an act of changing the stored data type mappings by at least mapping the first data type with the new display format that is different from the first display format;
    an act of dynamically modifying the initial data viewer based on the received user input, including the changes to the stored data type mappings, while the accessed data model is being displayed, to create a new data viewer;
    an act of assigning a name to the new data viewer;
    an act of dynamically applying the new data viewer to the accessed data model by at least displaying the accessed data model using the new data viewer, thereby simultaneously presenting the first data portion in the new display format while also presenting the second data portion in the second display format; and
    an act of storing the new data viewer in a viewer repository by reference to the assigned name, such that other users can access and use the new data viewer by reference to the assigned name.

2. The method of claim 1, further comprising selecting the initial data viewer based on the stored data type mappings.

3. The method of claim 1, wherein the context of the second data portion relative the first data portion within the data model comprises at least one of: top-level with respect to the first data portion, embedded within the first data portion, part of a collection with the first data portion, single relative to the first data portion, or an item in a list with the first data portion.

4. The method of claim 1, wherein the act of storing the new data viewer in a viewer repository comprises storing only the changes made to the initial data viewer.

5. The method of claim 1, further comprising:
    an act of receiving a user input requesting to use new data viewer to display at least a portion of requested data; and
    an act of displaying the requested data using the new data viewer.

6. The method of claim 1, wherein the second display format is the same as the first display format, and wherein the new display format is different from the first display format and the second display format.

7. The method of claim 1, wherein both of the initial data viewer and the new data viewer present at least the first data portion and the second data portion while also illustrating relationships between the first data portion and the second data portion within the data model based on the context of the first data portion relative to the second data portion within the data model.

8. The method of claim 1, wherein the second display format is different from the first display format, and wherein the new display format is different from the first display format and the second display format.

9. The method of claim 1, wherein the second display format is different from the first display format, and wherein the new display format is the same as the second display format.

10. The method of claim 1, wherein the new display format comprises a list item display format or an embedded spreadsheet display format.

11. The method as recited in claim 1, wherein the first display format is the same as the second display format.

12. The method as recited in claim 1, wherein each of the first display format and the second display format comprise a hierarchical display format.

13. A storage media having stored thereon computer-executable instructions that, when executed by a processor of a computer system, cause the computer system to perform a method, comprising:
    an act of a computer system, having a memory operatively coupled to a processor, accessing a data model that is to be displayed using a first data viewer,
        wherein the accessed data model comprises a first data portion having a first data type and a first context within the data model and a second data portion having a second different data type and a second context within the data model, and
        wherein the initial data viewer is configured to simultaneously display each data portion according to (i) stored data type mappings that map the first and second data portions to different display formats based on the first and second data types, and (ii) the corresponding context of each data portion relative to one another within the data model, such that the first data viewer is configured to display the first data portion in a first display format based on the stored data type mappings and the first context and displays the second data portion in a second display format based on the stored data type mappings and the second context;

an act of the computer system selecting the first display format and the second display format, including selecting at least the second display format based on the second context of the second data portion relative to the first data portion within the data model overriding the mapped to display format for the second data portion as defined in the stored data type mappings;

an act of presenting the accessed data model using the initial first data viewer by simultaneously presenting the first data portion in the first display format while also presenting the second data portion in the second display format;

an act of receiving user input from a first user simultaneous to the accessed data model being presented, the user input expressly mapping the first data type with a new display format that is different from the first display format;

subsequent to and in response to receiving the user input, an act of changing the stored data type mappings by at least mapping the first data type with the new display format that is different from the first display format;

based on the received user input, including the changes to the stored data type mappings, an act of dynamically modifying the first data viewer to create a second data viewer, while the accessed data model is being displayed by the first data viewer;

an act of assigning a name to the second data viewer;

an act of dynamically applying the second data viewer to the accessed data model by at least displaying the accessed data model using the second data viewer, thereby simultaneously presenting the first data portion in the new display format while also presenting the second data portion, without modifying the second display format used to display the second portion; and an act of storing the second data viewer in a viewer repository by reference to the assigned name, such that other users can access and use the second data viewer by reference to the assigned name.

14. The storage media of claim 13, wherein the first context within the data model comprises the first data portion being part of a list of data items and first display format presents the first data portion in list form, and wherein the second context within the data model comprises the second data portion being part of a table or spreadsheet and the second display format presents the first data portion in table or spreadsheet form.

15. A computer system comprising a processor operatively coupled to a memory and one or more storage media having stored there on computer-executable instructions that, when executed by the processor, perform a method, comprising:

an act of a computer system, having a memory operatively coupled to a processor, accessing a data model that is to be displayed using a first data viewer, wherein the accessed data comprises a first data portion having a first data type and a first data context within the data model and a second data portion having a second data type and a second data context within the data model, and wherein the first data viewer is configured to simultaneously display each data portion according to (i) stored data type mappings that map each data portion to corresponding display formats based on the first and second data types and (ii) data context of each data portion relative to one another within the data model, such that the first data viewer is configured to display the first data portion in a first display format and the second data portion in a second display format based on the data mappings and on and the data contexts of each data portion relative to one another within the data model;

an act of the computer system selecting the first display format and the second display format, including selecting at least the second display format based on the data context of the second data portion relative to the first data portion within the data model overriding the mapped to display format for the second data portion as defined in the stored data type mappings;

an act of presenting the accessed data using the first data viewer by simultaneously presenting the first data portion in the first display format while also presenting the second data portion in the second display format;

an act of receiving user input from a first user simultaneous to the accessed data being presented, the user input expressly mapping the first data type with a new display format that is different from the first display format;

subsequent and in response to receiving the user input, an act of changing the stored data type mappings by mapping one or more of the first data type or the first data context with the new display format that is different from the first display format;

an act of dynamically creating a second data viewer based on the received user input, including the changes to the stored data type mappings, while the accessed data is being displayed;

an act of assigning a name to the second data viewer;

an act of dynamically applying the second data viewer to the accessed data by at least displaying the accessed data using the second data viewer, thereby simultaneously presenting the first data portion in the new display format while also presenting the second data portion in the second display format; and an act of storing the second data viewer in a viewer repository by reference to the assigned name, such that other users can access and use the second data viewer by reference to the assigned name.

16. The computer system of claim 15, wherein the act of changing the stored data type mappings comprises mapping both of the first data type and the first data context with the new display format.

* * * * *

UNITED STATES PATENT AND TRADEMARK OFFICE
CERTIFICATE OF CORRECTION

PATENT NO.       : 8,140,593 B2  
APPLICATION NO.  : 12/121485  
DATED            : March 20, 2012  
INVENTOR(S)      : Murray et al.

Page 1 of 1

It is certified that error appears in the above-identified patent and that said Letters Patent is hereby corrected as shown below:

In the Claims

In column 11, line 13, In Claim 13, delete "initial first" and insert -- first --, therefor.

In column 11, line 30, In Claim 13, delete "viewer," and insert -- viewer --, therefor.

In column 12, line 15, In Claim 15, after "and on" delete "and".

Signed and Sealed this  
Third Day of February, 2015

Michelle K. Lee  
*Deputy Director of the United States Patent and Trademark Office*